*E. Maynard,*
*Cradle,*
Nº 8,957.    Patented May 18, 1852.
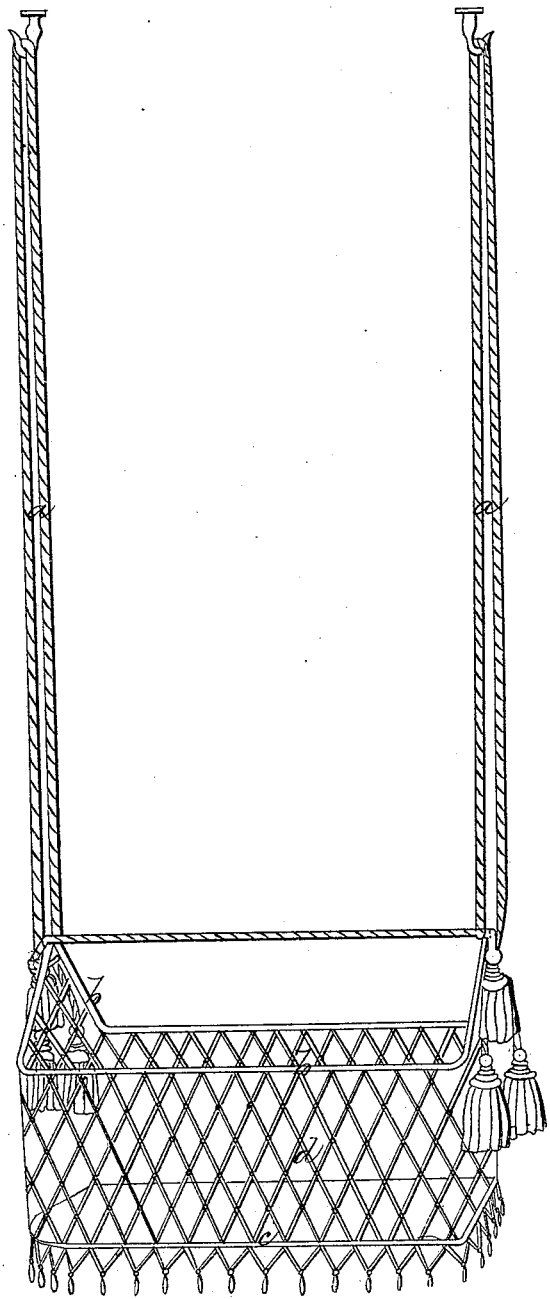

UNITED STATES PATENT OFFICE.

EDWD. MAYNARD, OF NEW YORK, N. Y.

SWING.

Specification of Letters Patent No. 8,957, dated May 18, 1852.

*To all whom it may concern:*

Be it known that I, EDWARD MAYNARD, of New York, in the county and State of New York, have invented certain new and useful Improvements in Cradles for Rocking or Nursing Children; and I do hereby declare the following to be a full, clear, and exact description of the same, reference being had to the annexed drawings, making a part of this specification, the figure being a perspective view of the same.

I provide, as seen in the drawing, suspension cords (*a*) one for each end of the "cradle." A frame, of wire as (*b*), having its two ends raised, so that it may receive the suspension cords (*a*) at the raised part is used for a top frame and plain wire frame is used as a frame for the bottom part (see *c*).

The sides and bottom are made up entirely of net work (*d*). This net work is put together in meshes, like a net. Thus the net work and the two frames, with the suspension cords make up the entire "cradle."

The suspension cords may be held to the ceiling or any fixture for the purpose, when the "cradle," may be swung on the cords instead of rocking. This "cradle" is free from common annoyances; as the incessant noise and creaking, the rolling of the child from side to side, &c.

Having thus fully described my invention what I claim as my invention and desire to secure by Letters Patent, is—

The combination of the wire frames constructed as set forth, with the net work and swing cords.

EDWARD MAYNARD,

Witnesses:
J. L. KINGSLEY,
ABRAM LONG,